US006922294B2

(12) United States Patent
Pierson et al.

(10) Patent No.: US 6,922,294 B2
(45) Date of Patent: Jul. 26, 2005

(54) OPTICAL COMMUNICATION ASSEMBLY

(75) Inventors: Mark V. Pierson, Binghamton, NY (US); Eugen Schenfeld, South Brunswick, NJ (US)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 10/428,956

(22) Filed: May 2, 2003

(65) Prior Publication Data

US 2004/0218288 A1 Nov. 4, 2004

(51) Int. Cl.[7] .............................. G02B 7/02; G02B 6/26; G02B 6/34
(52) U.S. Cl. ...................... 359/819; 359/821; 359/812; 385/31; 385/36
(58) Field of Search ................................ 359/819, 821, 359/812; 385/31, 36, 147, 136, 137, 135

(56) References Cited

U.S. PATENT DOCUMENTS

| 3,507,756 | A | 4/1970 | Wenger |
| 4,681,654 | A | 7/1987 | Clementi et al. ............ 156/630 |
| 4,969,712 | A | 11/1990 | Westwood et al. ............ 350/96 |
| 5,067,805 | A | 11/1991 | Corle et al. .................. 359/235 |
| 5,170,931 | A | 12/1992 | Desai et al. ............... 228/180.2 |
| 5,201,451 | A | 4/1993 | Desai et al. .................. 228/5.5 |
| 5,228,863 | A | 7/1993 | Campbell et al. ............. 439/67 |
| 5,241,612 | A | 8/1993 | Iwama .......................... 385/74 |
| 5,346,861 | A | 9/1994 | Khandros et al. ............ 437/209 |
| 5,414,819 | A | 5/1995 | Redmond et al. ............ 395/325 |
| 5,439,647 | A | 8/1995 | Saini ........................ 422/82.11 |
| 5,446,814 | A | 8/1995 | Kuo et al. ...................... 385/31 |
| 5,546,373 | A | 8/1996 | Koyama ...................... 369/120 |
| 5,570,231 | A | 10/1996 | Mogamiya ................... 359/640 |
| 5,611,006 | A | 3/1997 | Tabuchi ........................ 385/14 |
| 5,619,359 | A | 4/1997 | Redmond et al. ............ 359/117 |
| 5,731,899 | A | 3/1998 | Meyers ........................ 359/629 |
| 5,784,513 | A | 7/1998 | Kuribayashi et al. .......... 385/88 |
| 5,818,997 | A | 10/1998 | Fasanella et al. ............ 385/147 |
| 5,822,096 | A | 10/1998 | Redmond et al. ............ 359/129 |
| 5,844,257 | A | 12/1998 | Chen ............................ 257/91 |
| 5,857,042 | A | 1/1999 | Robertson et al. ............ 385/33 |
| 6,008,918 | A | 12/1999 | Kanterakis et al. .......... 359/117 |
| 6,018,418 | A | 1/2000 | Pan et al. .................... 359/495 |
| 6,034,821 | A | 3/2000 | Schenfeld .................... 359/618 |
| 6,049,639 | A | 4/2000 | Paniccia et al. ............... 385/14 |
| 6,052,498 | A | 4/2000 | Paniccia ........................ 385/14 |
| 6,365,962 | B1 | 4/2002 | Liang et al. ................. 257/668 |
| 6,796,715 | B2 * | 9/2004 | Chiu et al. ..................... 385/53 |

FOREIGN PATENT DOCUMENTS

| JP | 57198425 A | 1/1981 |
| JP | 06259902 A | 9/1994 |

* cited by examiner

Primary Examiner—Timothy Thompson
(74) Attorney, Agent, or Firm—Arthur J. Samodovitz

(57) ABSTRACT

An optical assembly comprising an optical cube. A first optical transmitter chip and a first optical receiver chip are mounted on one surface of the optical cube. A first continuous printed circuit board is soldered to electrical surfaces of the first optical transmitter chip and the first optical receiver chip opposite the optical cube. A second optical transmitter chip and a second optical receiver chip are mounted on an opposite surface of the optical cube. A second continuous printed circuit board is soldered to electrical surfaces of the second optical transmitter chip and the second optical receiver chip opposite the optical cube. The first optical transmitter chip is optically aligned with the second optical receiver chip through the optical cube. The second optical transmitter chip is optically aligned with the first optical receiver chip through the optical cube. The first and second printed circuit boards may be bent ninety degrees and soldered to another printed circuit board, or connected to an edge connector on another printed circuit board.

14 Claims, 2 Drawing Sheets

OPTICAL COMMUNICATION ASSEMBLY

FIELD OF THE INVENTION

The present invention relates to optical assemblies to permit optical communication between optical chips.

BACKGROUND OF THE INVENTION

Conventionally, integrated circuits have been mounted on organic or ceramic chip carriers to form electronic modules or packages. The chip carrier provides a mechanical support for the chip as well as electrical interconnection to a printed circuit board. Then, one or more of the electronic modules have been mounted on the printed circuit board to enable electrical communication between the chips and with other circuitry on the board. Two or more of such boards may be installed in a rack to enable electrical communication between the different boards.

Electrical conductors are limited in the rate at which they can propagate electrical signals. This is due to inherent resistance and inductance in the conductors and parallel capacitance caused by adjacent capacitors and other circuitry. Also, for some complex applications, there may not be adequate surface area on the boards for all the conductors that are needed. Also, cross-talk may be a problem for some applications, especially when the conductors are close together and operating at high switching rates.

It was known to mount an integrated circuit on each face of an optical cube to permit the integrated circuits to optically communicate with each other. See for example, U.S. Pat. No. 6,034,821 which describes a two section cube and also mentions a six section cube where each section is a four-sided pyramid. One of the integrated circuits on one face may be a VCSEL which transmits optical signals through the cube. Another of the integrated circuits on another face may be an optical receiver to receive the optical signal transmitted through the cube from the VCSEL. The known optical cubes provide different types of routing of the optical signals. The optical signals can be transmitted straight through the cube to an optical device on a face of the cube opposite to that of the transmitting VCSEL. Alternately, the optical signals can be transmitted partially into the cube and then reflected at ninety degrees by a mirror within the cube. The reflected optical signal can be received by an optical device on a face of the cube which is perpendicular to that of the transmitting VCSEL. The mirror is provided by a reflective, forty five degree internal surface of the cube. Partial mirrors are also known where part of the optical signal passes straight through the partial mirror and the remaining part of the optical signal is reflected at ninety degrees.

The bandwidth of light is much greater than that of an electrical conductor such that these optical communications can occur at a very fast rate. However, there have been some complexities in known optical cubes in bringing electrical signals to and from the chips mounted on the optical cube. Also, there have been some difficulties in known optical cubes in optimizing the throughput of the integrated circuits mounted on the cube.

Accordingly, an object of the present invention is to optimize the throughput of integrated circuits mounted on the optical cube.

Another object of the present invention is to provide a simpler technique to bring electrical signals to and from integrated circuits mounted on the optical cube.

SUMMARY OF THE INVENTION

The present invention resides in an optical assembly comprising an optical cube. A first optical transmitter chip and a first optical receiver chip are mounted on one surface of the optical cube. A first continuous printed circuit board is soldered to electrical surfaces of the first optical transmitter chip and the first optical receiver chip opposite the optical cube. A second optical transmitter chip and a second optical receiver chip are mounted on an opposite surface of the optical cube. A second continuous printed circuit board is soldered to electrical surfaces of the second optical transmitter chip and the second optical receiver chip opposite the optical cube. The first optical transmitter chip is optically aligned with the second optical receiver chip through the optical cube. The second optical transmitter chip is optically aligned with the first optical receiver chip through the optical cube.

According to one feature of the present invention, the optical assembly comprises an optical cube, a generally rigid printed circuit board and a flexible printed circuit board. A first optical chip has an optical surface mounted on a surface of the optical cube and an electrical surface is flip-chip mounted to the rigid printed circuit board. A second optical chip has an optical surface mounted on an opposite surface of the optical cube and an electrical surface electrically connected to the flexible printed circuit board. The flexible printed circuit board is also electrically connected to the rigid printed circuit board. The first optical chip and the second optical chip are optically aligned with each other through the optical cube such the first and second optical chips can communicate with each other.

According to another feature of the present invention, the optical assembly comprises an optical transfer block. An optical chip has an optical surface mounted to a surface of the optical transfer block. A first printed circuit board is soldered to an opposite, electrical surface of the chip. An edge connector is mounted onto a second printed circuit board. The first printed circuit board has an edge portion inserted into the edge connector to make electrical connection with conductors within the edge connector.

DETAILED DESCRIPTION OF THE PRESENT INVENTION

Figure 1:
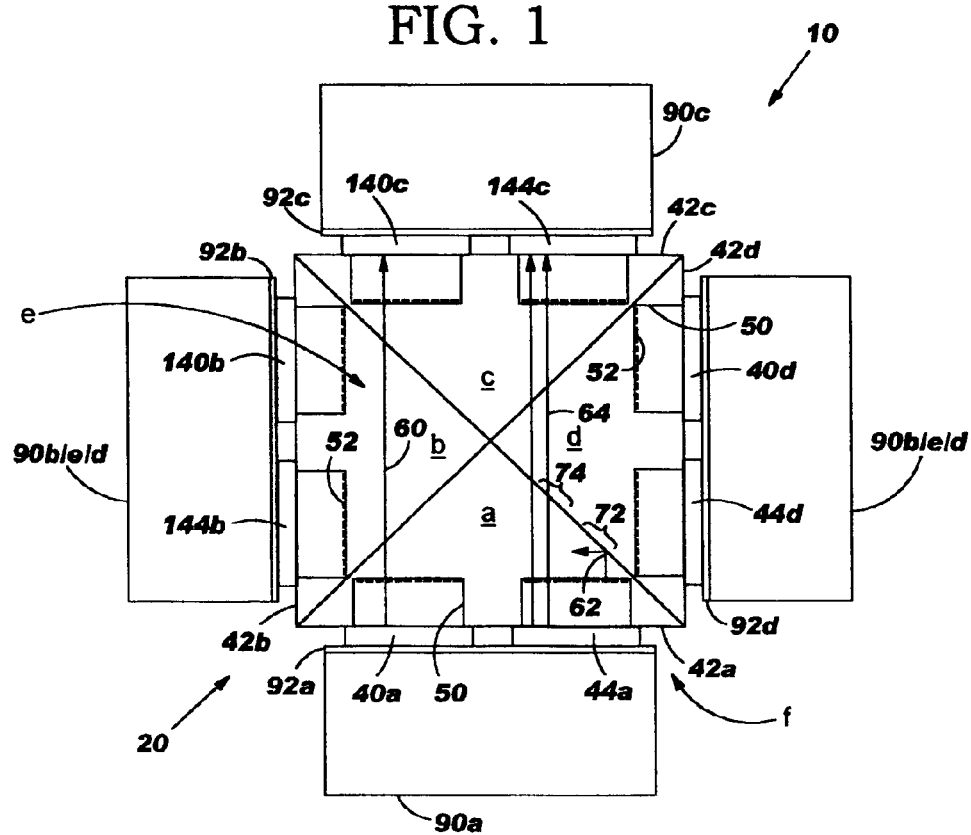
FIG. 1 is a top section view of an optical assembly according to the present invention.

Referring now to the Figures in detail wherein like reference numbers indicate like elements throughout, FIG. 1 illustrates an optical assembly generally designated 10 according to the present invention. Optical assembly comprises six pyramid shaped optical sections a,b,c,d,e,f joined together by an adhesive to form a cube 20. In the orientation illustrated in FIG. 1, sections a,b,c,d are "side" sections, section e is a "top" section and section f is a "bottom" section. (Top section e is not visible in FIG. 1 because it has been removed to better show the side sections. Bottom section f is also not visible in FIG. 1 because it is hidden beneath the side sections.) By way of example, the adhesive can be UV cured, optically clear acrylic, and the pyramids are molded or ground. Each of the pyramids is identical and formed from an optically transmissive/clear material, such as plastic or glass. Each of the pyramids a,b,c,d,e,f has four identical sides each in the shape of an equilateral triangle. However, the present invention can also be implemented with other types of optical cubes or shapes. For example, the present invention can be implemented with a cube formed by two sections with the following shape. Each section has the shape of half of a cube which has been cut from one edge to an opposite, parallel edge (and thereby having two opposite triangular faces and three rectangular faces as shown in U.S. Pat. No. 6,034,821.)

Optical transmitter chips 40(*a*) and 44(*a*) have optical surfaces mounted to a face 42(*a*) of the cube 20, and optical receiver chips 140(*a*) and 144(*a*) are mounted on the same face 42(*a*) of the cube. Likewise each other face 42*b,c,d,e,f* of the cube 20 has two respective optical transmitter chips and two optical receiver chips mounted thereon, i.e. optical transmitter chips 40(*b*) and 44(*b*) and optical receiver chips 140(*b*) and 144(*b*) on face 42*b*, optical transmitter chips 40(*c*) and 44(*c*) and optical receiver chips 140(*c*) and 144(*c*) on face 42*c*, optical transmitter chips 40(*d*) and 44(*d*) and optical receiver chips 140(*d*) and 144(*d*) on face 42*d*, optical transmitter chips 40(*e*) and 44(*e*) and optical receiver chips 140(*e*) and 144(*e*) on face 42*e*, and optical transmitter chips 40(*f*) and 44(*f*) and optical receiver chips 140(*f*) and 144(*f*) on face 42*f*. Each of the optical transmitter chips and optical receiver chips has an optical surface mounted to the respective face of the cube by adhesive such as an optically clear, UV curable, acrylic adhesive on the perimeter of the chip. Depending on the type of optical transmitter used, a heat sink may be required. The heat sink would be located either directly on the chip or on an opposite side of a flexible printed circuit board 90*a*, 90*c* or 90*b*/*e*/*d* attached to the chip. If it is mounted directly to the opposite side of the flexible printed circuit board, there would be several copper vias through the flexible printed circuit board leading from the chip on one side of the flexible printed circuit board to the heat sink on the other side of the flexible printed circuit board to transmit the heat away from the chip. Each of the chips overlays a respective opening or inset 50,50 in the cube. An inner surface of each inset is shaped as a series of miniature lenses or lenslets 52,52 to facilitate alignment of the optical transmitters and optical receivers. The lenslets are also aligned with the outer cube surfaces on which the optical transmitters and optical receivers are located. By way of example, the lenslets are made of optically clear plastic or plexiglass (acrylic). By way of example, each optical transmitter is a VCSEL and each optical receiver comprises photo sensitive diodes.

The cube 20 permits (a) transmission of light such as light signal 60 straight through the cube from one surface to an opposite surface, (b) ninety degree mirrored reflection of light such as light signal 62 from one surface of the optical cube to a perpendicular surface of the optical surface and (c) transmission of part 64 of the light signal straight through the cube and ninety degree mirrored reflection of the remaining part 66 of the light signal in a "beam splitting" arrangement. If unimpeded, light signal 60 will pass straight through the cube from one lenslet to an opposite lenslet. To permit such passage of light, the junction between any of the optical sections a,b,c,d,e,f in the path of the light, needs to be substantially transparent. This is aided by smooth surfaces of the sections a,b,c,d,e,f and lack of voids in the adhesive bonding the sections together. To cause a ninety degree reflection for light signal 62 originating from surface 42*a*, a surface region 72 on pyramid section 42*d* in the path of the light is completely coated with a mirror material such as chrome. Thus, light signal 62 will be reflected ninety degrees to the surface 42*b*. The "100%" mirror reflects substantially all the light signal 62 such that virtually no light passes through the mirror to surface 42*c*. To cause a beam splitting of light signal 64,66, a surface region 74 of pyramid 42*d* is lightly coated with a partial mirror material such as chrome. The "partial" mirror reflects approximately half of the light signal 66 at a ninety degree angle toward surface 42*b* and passes approximately half of the light signal 64 toward surface 42*c*.

Figure 2:
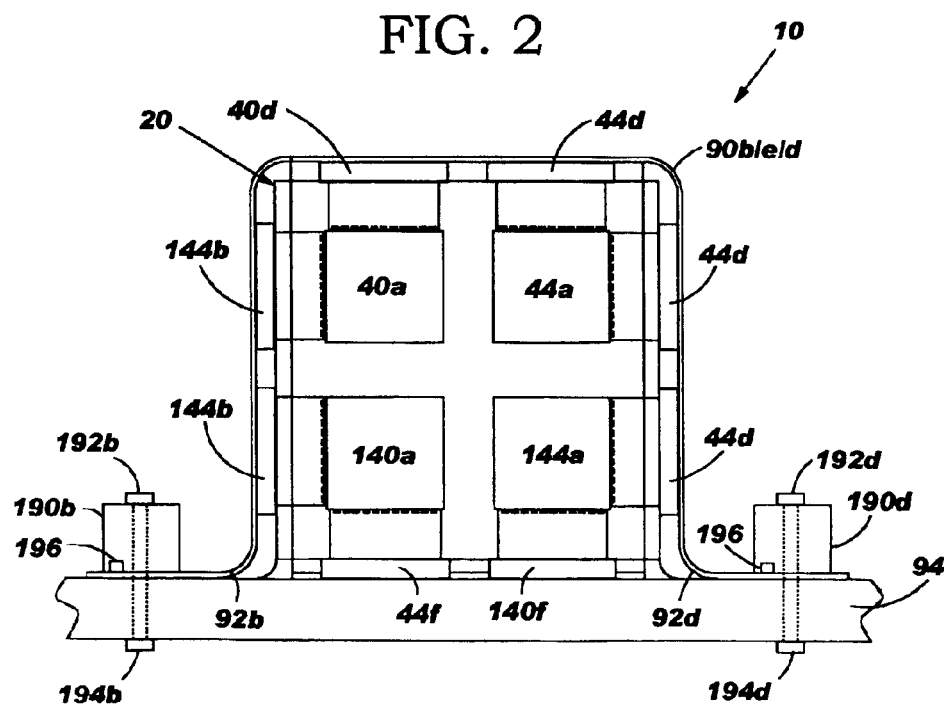
FIG. 2 is a side view of the optical assembly of FIG. 1.

FIG. 1 illustrates the three flexible printed circuit boards 90*a*, 90*c* and 90*b*/*e*/*d* (although the top, horizontal portion of flexible printed circuit board 90*b*/*e*/*d* has been removed to illustrated the remainder the optical cube 20 beneath it). Each of the flexible printed circuit boards comprises a flexible substrate such as a sheet of polyimide having a thickness approximately 51 to 76 micrometers (about 0.002 to 0.003 inch). There is conductive circuitry on the flexible substrate formed by a copper develop, etch and strip process on the polyimide sheet. Further details about flexible printed circuit boards in general can be found in U.S. Pat. No. 4,681,654 to Clementi et al. which patent is hereby incorporated by reference as part of the present disclosure. Some of the electrical conductors on the flexible printed circuit board are pads as described below to interconnect to the optical transmitter and receiver chips. Other of the electrical conductors on the flexible printed circuit board are used to interconnect the optical transmitter and receiver chips with each other and with a rigid printed circuit board 94 described below. "L" shaped flexible printed circuit board 90*a* is for the optical transmitter and receiver chips on surface 42*a*. "L" shaped flexible printed circuit board 90*c* is for the optical transmitter and receiver chips on surface 42*c*. "Serpentine" shaped flexible printed circuit board 90*b*/*e*/*d* is for the optical transmitter and receiver chips on surfaces 42*b*, 42*e* and 42*d* as illustrated in FIG. 2. Thus, flexible printed circuit board 90*a* is mechanically and electrically connected to the exposed surfaces of optical transmitter chips 40*a* and 44*a* and optical receiver chips 140*a* and 144*a*. Flexible printed circuit board 90*c* is mechanically and electrical connected to the exposed surfaces of optical transmitter chips 40*c* and 44*c* and optical receiver chips 140*c* and 144*c*. Flexible printed circuit board 90*b*/*e*/*d* is mechanically and electrically connected to the exposed surfaces of optical transmitter chips 40*b* and 44*b* and optical receiver chips 140*b* and 144*b*, optical transmitter chips 40*e* and 44*e* and optical receiver chips 140*e* and 144*e* and optical transmitter chips 40*d* and 44*d* and optical receiver chips 140*d* and 144*d*.

Each of the optical transmitter and optical receiver chips is mechanically and electrically bonded to the respective flexible printed circuit board by solder balls in a "flip chip" arrangement. According to this flip chip arrangement, there are multiple solder pads on the exposed, electrical surface of each optical transmitter chip and each optical receiver chip and multiple, aligned solder pads on the flexible printed circuit board. A solder ball is attached to the solder pads on the chips and/or the flexible printed circuit board. An example of a suitable solder ball on the chips is 97%/3% (lead/tin) or 90%/10% (lead/tin) solder. Then, the flexible printed circuit board is brought into close proximity with the chips. Then, 63%/37% (lead tin) solder on the flexible printed circuit board is reflowed to join the optical transmitter chips and optical receiver chips to the flexible printed circuit board. (If desired, an electrically conductive adhesive can be used instead of the solder balls or solder paste.) The IBM controlled collapse chip connection ("C4") such as described in U.S. Pat. No. 6,365,962 to Chunlin et al. and U.S. Pat. No. 3,507,756 to J. A. Wenger et al and U.S. Pat. No. 5,346,861 to Khandros et al. can be used to bond the chips to the flexible printed circuit board. Additional mechanical connection between the chips and the flexible printed circuit board can also be provided by an adhesive underfill in the gap between the chips and the flexible printed circuit board. An example of a suitable adhesive underfill is CSP 1412 from Zymet Corporation.

As illustrated in FIGS. 1 and 2, each flexible printed circuit board is folded at corners 92a,b,c,d by ninety degrees to be adjacent and parallel to rigid printed circuit board 94. This facilitates mechanical and electrical connection of the flexible printed circuit boards 90a, 90c and 90b/e/d to the rigid printed circuit board 94 as described below. By way of example, printed circuit board 94 is made of FR4 or prepreg material, and circuitized on the surface adjacent to the flexible printed circuit boards. There can be multiple layers of such FR4 or prepreg material, with each layer being circuitized or having a power plane. There are different techniques to connect each flexible printed circuit board 92a,b,c,d to the rigid printed circuit board 94.

One technique is to permanently join solder pads on the underside of the flexible printed circuit board to solder pads on the upper surface of the rigid printed circuit board with solder balls or solder paste. A 90%/10% (lead/tin) solder can be used on the flexible printed circuit board and/or 97%/3% (lead/tin) solder can be used on the rigid printed circuit board. Another technique is to removably join contact pads on the underside of the flexible printed circuit board to contact pads on the upper surface of the printed circuit board as described in detail in U.S. Pat. No. 5,228,863 to Campbell et al. which patent is hereby incorporated by reference as part of the present disclosure. According to U.S. Pat. No. 5,228,863, a block 190a,b,c,d is located above each horizontal portion of the flexible printed circuit board which is adjacent to printed circuit board 94. Only blocks 190b and 190d are illustrated, although there are also similar blocks 190a and 190c for flexible printed circuit boards 90a and 90c. The interconnect pads on the flexible printed circuit board and the rigid printed circuit board are copper plated with a precious metal. Above each contact pad is a silicone elastomer spring 196,196 that supplies a specific force to push one pad against the other. Several silicone springs are attached to each solid block. Fasteners 192d and 94d supply the required force per contact for a reliable connection.

Also as illustrated in FIG. 2, the optical transmitter chips 40f and 44f and optical receiver chips 140f and 144f are directly attached in a flip chip arrangement to printed circuit board 94. (Optical receiver chip 40f and optical transmitter chip 144f are not shown in FIG. 2, but are located "behind" optical receiver chip 44f and optical transmitter chip 140f in the orientation shown in FIG. 2. Optical receiver chips 140e and 144e are mounted on the top surface 42e of optical cube 20 opposite optical transmitter chips 40f and 44f, respectively. Optical transmitter chips 40e and 44e are mounted on the top surface of optical cube 20 opposite optical receiver chips 140f and 140f, respectively.) In the preferred embodiment of the present invention, there is no intervening flexible printed circuit board between optical transmitter chips 40f and 44f and optical receiver chips 140f and 144f and rigid printed circuit board 94.

As described above, according to the flip chip arrangement, there are solder pads on the exposed, electrical under-surfaces of chips 40f, 44f, 140f and 144f and the upper exposed surface of rigid printed circuit board 94, and they are joined together by solder balls or solder paste. By way of example, the solder balls can be 90%/10% (lead/tin) or 97%/3% (lead/tin) solder on the chip and 63%/37% (lead/tin) solder on the rigid printed circuit board. (It is also possible to use electrically conductive adhesive.) An adhesive underfill such as Zymet #csp1412 can also be provided for improved mechanical strength.

Other electrical chips can be mounted on the rigid printed circuit board to electrically communicate with the optical transmitter and receiver chips on the optical cube, and to permit electrical communication between the optical transmitter and receiver chips on the optical cube.

Figure 3:
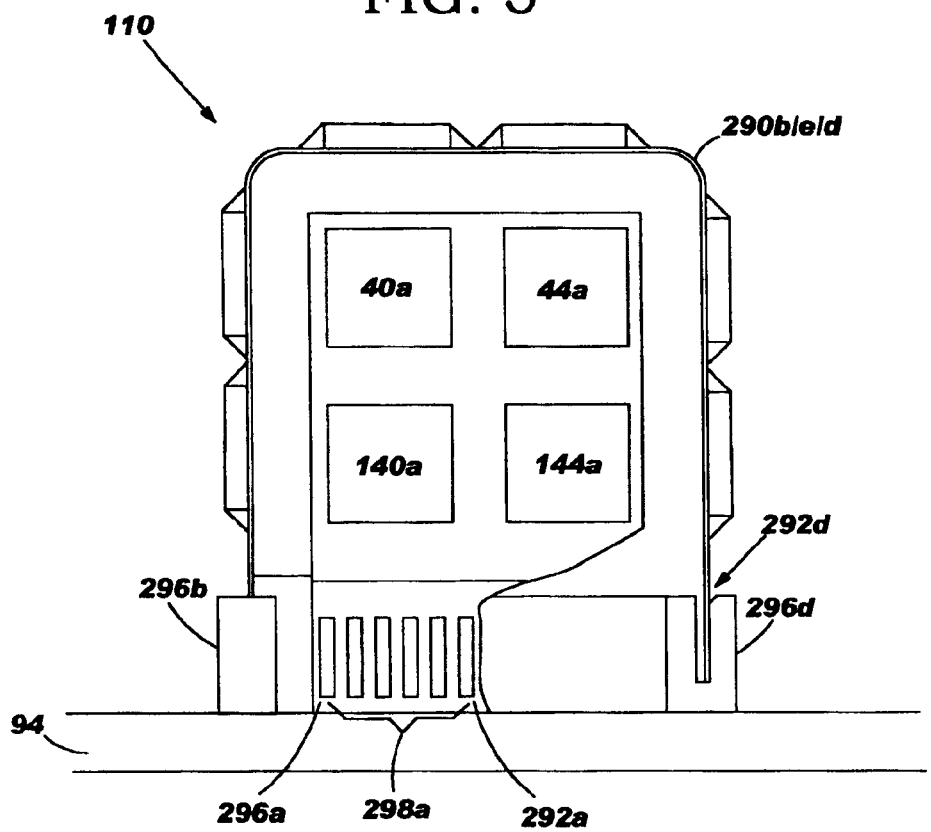
FIG. 3 is a side view, partially in section, of an optical assembly in accordance with another embodiment of the present invention.
Figure 4:
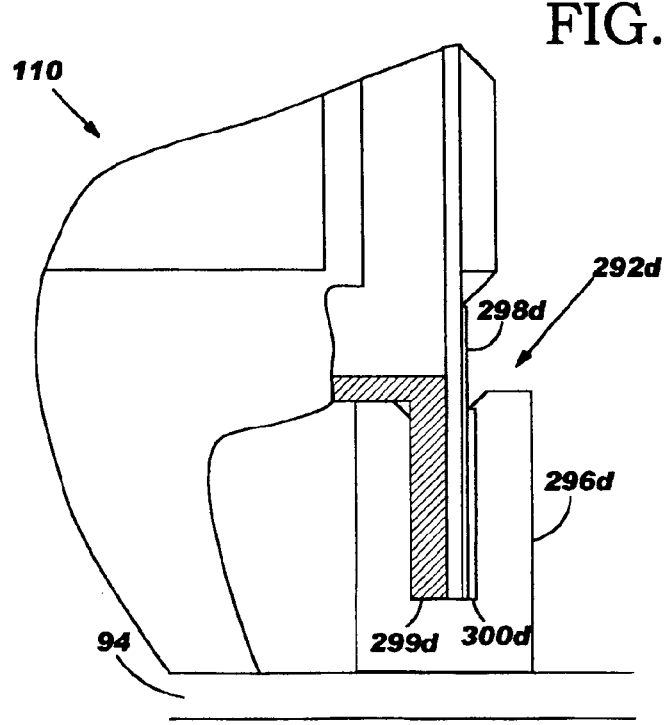
FIG. 4 is a more detailed, side section view of an electrical connection between the optical assembly of FIG. 3 and a printed circuit board.

FIG. 3 illustrates an alternate embodiment of an optical assembly generally designated 110 according to the present invention. Optical assembly 110 is identical to optical assembly 10 except flexible printed circuit boards 290a, 290c and 290b/e/d replace flexible printed circuit boards 90a, 90c and 90b/e/d. (Only flexible printed circuit board 190b/e/d is shown in FIG. 3.) Flexible printed circuit boards 290a, 290c and 290b/e/d are identical to flexible printed circuit boards 90a, 90c and 90b/e/d respectively except that flexible printed circuit boards 290a, 290c and 290b/e/d do not include corners 92a,b,c,d or the horizontal end portions of the flexible printed circuit boards 90a, 90c and 90b/e/d adjacent to rigid printed circuit board 94. Instead flexible printed circuit boards 290a, 290c and 290b/e/d include end portions 292a, 292b, 292c and 292d forming inserts for respective edge connectors 296a, 296b, 296c and 296d. (Only end portions 292a and 292d are shown in FIG. 3.) As shown in FIG. 4, end portion 292d comprises a portion of the flexible printed circuit board 290b/e/d continuous and integral with the remainder of the flexible printed circuit board 290b/e/d. End portion 292d comprises a portion of the flexible polyimide sheet with vertical "gold finger" conductors 298d on the outer surface of the polyimide sheet. (FIG. 3 shows a multiplicity of the vertical gold finger conductors 298a on end portion 292a.) On the inner surface of the polyimide sheet is a stiffener 299d. By way of example, stiffener 299d is made of plastic and injection molded and adhesively bonded to the polyimide sheet. Within edge connector 296d are vertical "gold finger" conductors 300d aligned with the conductors 298d. Conductors 300d within edge connector 296d are electrically connected to conductors on printed circuit board 94 by contact and friction. The connector 296d is mechanically connected to the rigid printed circuit board 94 by fasteners or solder. The electrical connections to the rigid printed circuit board 94 is provided by soldered surface mount (preferably) or soldered pin in hole.

Based on the foregoing, optical assemblies according to the present invention have been disclosed. However, numerous modifications and substitutions can be made without deviating from the scope of the present invention. For example, fewer or more optical transmitter and optical receiver chips can be mounted on each surface of the optical cube. Also, different arrangements of flexible printed circuit boards can be used to interconnect the optical chips on each surface of the optical cube to the rigid printed circuit board. For example, a separate flexible printed circuit board can be used to interconnect the chips on each surface of the optical cube to the rigid printed circuit board. Also, if desired a flexible printed circuit board with a "U" shaped cross section can be used to interconnect chips 40f, 44f, 140f and 144f on the underside of the optical cube 20 to the rigid printed circuit board 94. In this alternate embodiment, the chips are flip-chip connected to one end portion of the flexible printed circuit board, and another end portion of the flexible printed circuit board is soldered to the rigid printed circuit board 94 or removably joined to the rigid printed circuit board 94 as described in U.S. Pat. No. 5,228,863. In between the two end portions of this "U" shaped flexible printed circuit board is a middle section of the flexible printed circuit board which makes a one hundred eighty degree fold to position the two end portions of the flexible printed circuit board as described above. Therefore, the present invention has been disclosed by way of illustration and not limitation, and reference should be made to the following claims to determine the scope of the present invention.

What is claimed is:

1. An optical assembly comprising:
   an optical cube;
   a first optical transmitter chip and a first optical receiver chip mounted on one surface of said optical cube;
   a first continuous printed circuit board soldered to electrical surfaces of said first optical transmitter chip and said first optical receiver chip opposite said optical cube;
   a second optical transmitter chip and a second optical receiver chip mounted on an opposite surface of said optical cube;
   a second continuous printed circuit board soldered to electrical surfaces of said second optical transmitter chip and said second optical receiver chip opposite said optical cube; and wherein
   said first optical transmitter chip is optically aligned with said second optical receiver chip through said optical cube, and said second optical transmitter chip is optically aligned with said first optical receiver chip through said optical cube.

2. An optical assembly as set forth in claim 1 wherein said first printed circuit board is flexible, and said second printed circuit board is flexible.

3. An optical assembly as set forth in claim 2 wherein said first printed circuit board includes a first end portion parallel to and electrically connected to another printed circuit board, and said second printed circuit board includes a second end portion parallel to and electrically connected to said other printed circuit board.

4. An optical assembly as set forth in claim 3 wherein said first end portion is soldered to said other printed circuit board, and said second end portion is soldered to said other printed circuit board.

5. An optical assembly as set forth in claim 1 wherein said optical cube comprises a plurality of optical sections such that one of said sections presents a forty-five degree angle, inner surface aligned with said first optical transmitter.

6. An optical assembly comprising:
   an optical cube;
   a generally rigid printed circuit board;
   a first optical chip having an optical surface mounted on a surface of said optical cube and an electrical surface flip-chip mounted to said rigid printed circuit board;
   a flexible printed circuit board;
   a second optical chip having an optical surface mounted on an opposite surface of said optical cube and an electrical surface electrically connected to said flexible printed circuit board;
   said flexible printed circuit board also being electrically connected to said rigid printed circuit board; and wherein
   said first optical chip and said second optical chip are optically aligned with each other through said optical cube such said first and second optical chips can communicate with each other.

7. An optical assembly as set forth in claim 6 wherein said first optical chip is an optical transmitter and said second optical chip is an optical receiver.

8. An optical assembly as set forth in claim 6 further comprising:
   a third optical chip having an optical surface mounted to the first said surface of said optical cube and an electrical surface flip-chip mounted to said rigid printed circuit board;
   a fourth optical chip having an optical surface mounted on said opposite surface of said optical cube and an electrical surface electrically connected to said flexible printed circuit board; and wherein
   said first and fourth chips are optical transmitter chips, and said second and third chips are optical receiver chips; and
   said third and fourth chips are optically aligned with each other through said optical cube such said third and fourth optical chips can communicate with each other.

9. An optical assembly comprising:
   an optical transfer block;
   an optical chip having an optical surface mounted to a surface of said optical transfer block;
   a first printed circuit board soldered to an opposite, electrical surface of said chip;
   a second printed circuit board;
   an edge connector mounted on said second printed circuit board, said first printed circuit board having an edge portion inserted into said edge connector to make electrical connection with conductors within said edge connector; and wherein said optical transfer block is transparent except for internal mirror regions.

10. An optical assembly as set forth in claim 9 wherein said first printed circuit board is flexible outside of said edge connector, and said edge portion comprises a stiffener.

11. An optical assembly as set forth in claim 9 wherein said edge connector is mounted on a face of said second printed circuit board.

12. An optical assembly comprising:
    an optical transfer block;
    an optical chip having an optical surface mounted to a surface of said optical transfer block;
    a first printed circuit board soldered to an opposite, electrical surface of said chip;
    a second printed circuit board;
    an edge connector mounted on said second printed circuit board, said first printed circuit board having an edge portion inserted into said edge connector to make electrical connection with conductors within said edge connector; and wherein said first printed circuit board is perpendicular to said second printed circuit board.

13. An optical assembly as set forth in claim 9 further comprising:
    a second optical chip having an optical surface mounted to another surface of said optical transfer block, and an electrical surface flip-chip mounted to said second printed circuit board.

14. An optical assembly as set forth in claim 12 wherein said optical transfer block is transparent except for internal mirror regions.

* * * * *